United States Patent [19]
Wilke et al.

[11] Patent Number: 5,992,780
[45] Date of Patent: Nov. 30, 1999

[54] METHOD FOR CONTROLLING THE SPEED OF HORIZONTALLY ROTATABLE SUPPLY TURNTABLES FOR TAPE MATERIAL

[75] Inventors: Gerald Wilke, Munich; Guenter Peschke, Mering; Wolfgang Maier, Munich, all of Germany

[73] Assignee: Kinoton GmbH, Germering, Germany

[21] Appl. No.: 09/044,595

[22] Filed: Mar. 19, 1998

[51] Int. Cl.⁶ ............... G11B 25/06; B65H 59/38; G03B 21/48

[52] U.S. Cl. ............... 242/328.2; 242/334.2; 242/334.6; 352/180

[58] Field of Search ............... 242/328.2, 334, 242/334.2, 334.6; 352/180

[56] References Cited

U.S. PATENT DOCUMENTS

| | | | |
|---|---|---|---|
| 2,875,667 | 3/1959 | Chedister | 352/180 |
| 3,248,029 | 4/1966 | Money | 352/180 |
| 3,780,959 | 12/1973 | Burth | 242/328.2 |
| 3,823,890 | 7/1974 | Potts | 242/328.2 |
| 4,169,566 | 10/1979 | Boudouris et al. | 242/328.2 |
| 4,996,541 | 2/1991 | Mori et al. | 242/334 X |
| 5,648,834 | 7/1997 | Kitchen | 242/334.6 X |

*Primary Examiner*—John M. Jillions
*Assistant Examiner*—William A. Rivera
*Attorney, Agent, or Firm*—Anthony J. Casella; Gerald E Hespos

[57] ABSTRACT

Method for controlling the speed of horizontally rotatable supply turntables for tape material. In such a method for controlling the speed by measurement on a moving tape, especially on a film tape (3) in cinema show operation by removal from the inside convolution (4) of a reel (2) resting horizontally thereupon, the lead-in angle in front of a lead-in point (6) fixed in location is contactlessly measured by reflection of infrared light on both sides of the film strip (5) fed in. In case of deviations of the measurement signal from a nominal value, the reel drive is corrected. A dual infrared LED with reflection light barriers (11, 12) arranged offset in angle and height and approximately focused on the lead-in point (6) is used.

17 Claims, 2 Drawing Sheets

METHOD FOR CONTROLLING THE SPEED OF HORIZONTALLY ROTATABLE SUPPLY TURNTABLES FOR TAPE MATERIAL

BACKGROUND OF THE INVENTION

1. Field of the Invention

The invention relates to a method for controlling the speed of horizontally rotatable supply turntables for tape-shaped material which is taken from the inside convolution of a tape reel, by means of contactless detection of the position of the tape removed, and to a device for carrying out the method.

2. Description of the Prior Art

The speed of horizontally rotatable supply turntables for tape-shape material must be continuously corrected during the unwinding of the tape strip from the inside convolution of the reel resting thereupon if the speed of the tape strip removed must be kept constant during the unwinding process. In addition, fine regulation of the speed is required if the point of separation of the tape strip removed at the inside convolution fluctuates or twists in the direction of the circumference of the rotatable supply turntable. The motor drive for the supply turntable must be controlled in accordance with the required speed control.

The invention especially relates to a device for carrying out this method during the removal of a film tape, to be shown in a film projector, at the inside convolution of a film tape reel placed on a film turntable disc, in which arrangement the film strip removed can be supplied in the form of a tape loop to an insertion unit arranged centrally fixed in location concentrically with the turntable disc.

From DE 85 12 510 U1, a device for guiding out a film tape is known in which a horizontally deflectable load arm has at its free end two tape guides between which the tape removed at the inside convolution is fed in. The load arm swivels from its radially aligned starting position in accordance with the respective point of separation of the film tape from the reel and during this action operates, depending on the shape of the tape loop and on the direction from which it is fed in leading or lagging, one of two microswitches arranged on the insertion unit at a distance from its center axis. The microswitch operated in each case controls the electric motor driving the film turntable disc, in such a manner that the speed of the film turntable disc is increased or reduced until the tape loop is fed in radially once more.

The disadvantageous factor in this known type of construction is that the film turntable device must be constructed absolutely horizontally and that the microswitches must be accurately adjusted and frequently readjusted. Since, furthermore, the film strip taken from the reel must mechanically move a lever, the latter must be supported for easy movement.

From German patent specification 12 37 893, a device for simultaneously winding up and unwinding a film tape to be shown in a film projector and having a speed control is known, in which, on a stationary central support disc, two light barriers with an angular offset of about 90° and thus arranged with mutual spacing are provided in its circumferential area. The film strip passes either one or the other light barrier, depending on the point of separation of the tape loop from the inside convolution, and there triggers a corresponding switch contact for correcting the servo motor for the film turntable disc.

Such an arrangement of light barriers disadvantageously leads to misinterpretations in the event of a disturbed feed-in of the film strip, for example if more than one turn becomes detached from the reel due to splices in the film. Novel polyester film also leads to disturbances.

From U.S. Pat. No. 3,823,890 it is known to control the speed of a turntable disc for reels resting thereupon in dependence on the tension of the tape which is determined via the contactlessly sensed swivel position of a lever guiding the tape.

SUMMARY OF THE INVENTION

The invention is based on the object of controlling, in the methods initially mentioned and in the device provided therefore, the speed for a constant removal speed of tape material, especially of a film tape to be shown, largely without using mechanical parts by means of contactless sensing and without, during this process, being dependent on the type of tape or film used.

Measuring the angle at the tape strip fed in with the aid of light reflection provides a measuring method free of mechanically movable parts for controlling the speed.

If, advantageously, infrared light and a sensor mechanism responding to the latter is used in this angle measurement, scattering and interfering light influences can be eliminated. A contributing factor to this is if advantageously the lead-in angle is measured on both sides of the tape strip fed in and the associated measurement signals of both sides are compared with one another in their magnitude/amplitude and a difference signal is formed which, when a certain magnitude is reached, is used for correction.

The measures of the method can be advantageously used for regulating the speed of horizontally rotatable supply turntables for movie film if the film material to be shown in a projector rests as reel on the film turntable disc and is removed from its inside convolution.

To carry out the method, an insertion unit arranged centrally fixed in location concentrically with the rotatable film turntable disc contains a light-emitting diode arrangement consisting of two reflection light barriers behind a lead-in point for the film tape removed, the reflection light barriers, in a further development of the invention, being arranged with an angular offset from one another and symmetrically to the radial plan extending through the lead-in point, in such a manner that the light rays, preferably infrared light, emitted by transmitter diodes of the two reflection light barriers, intersect at the lead-in point, the transmitter diodes and the receiver diodes being focused on the lead-in point.

Such an oblique position and focusing and an arrangement offset in height eliminates any interaction between the reflection light barriers. In addition to reliable operation even with thin unstable film material, a high insensitivity to faults in the installed position and, at the same time, easy adjustability and maintenance of the set values over a long time is obtained.

The lead-in point is suitably formed by lead-in skids, the arch-shaped rounded edges of which, allocated to the film tape fed in, form between them a gap. In the lead-in direction in front of this gap, the light reflection takes place on each side of the film strip. This gap ensures good separation of turns which may have been entrained, also of multi-layer turns, without influencing the switching result of the light barriers.

Further details of the invention are obtained from the features of the subclaims.

BRIEF DESCRIPTION OF THE DRAWINGS

An illustrative embodiment of the device according to the invention, which is explained in greater detail in the description, is reproduced in the drawing, in which.

DETAILED DESCRIPTION OF THE PREFERRED EMBODIMENT

Figure 1:
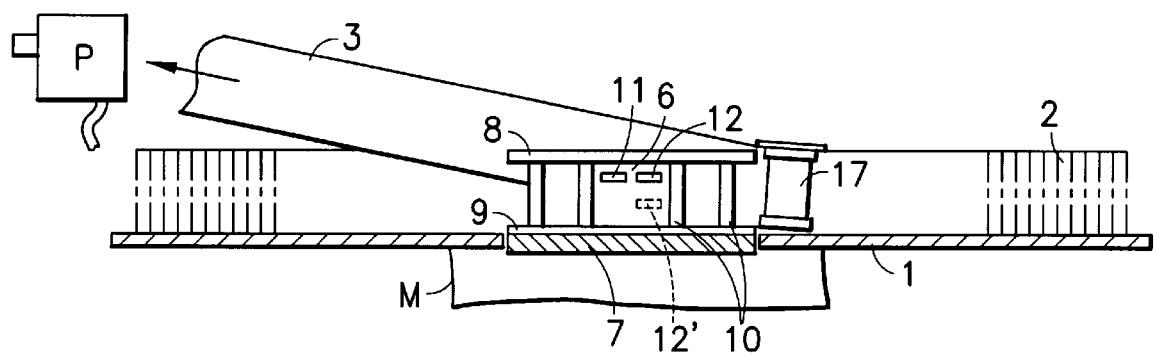
FIG. 1 shows a side view of the film turntable disc with central insertion unit, partially in section.
Figure 2:
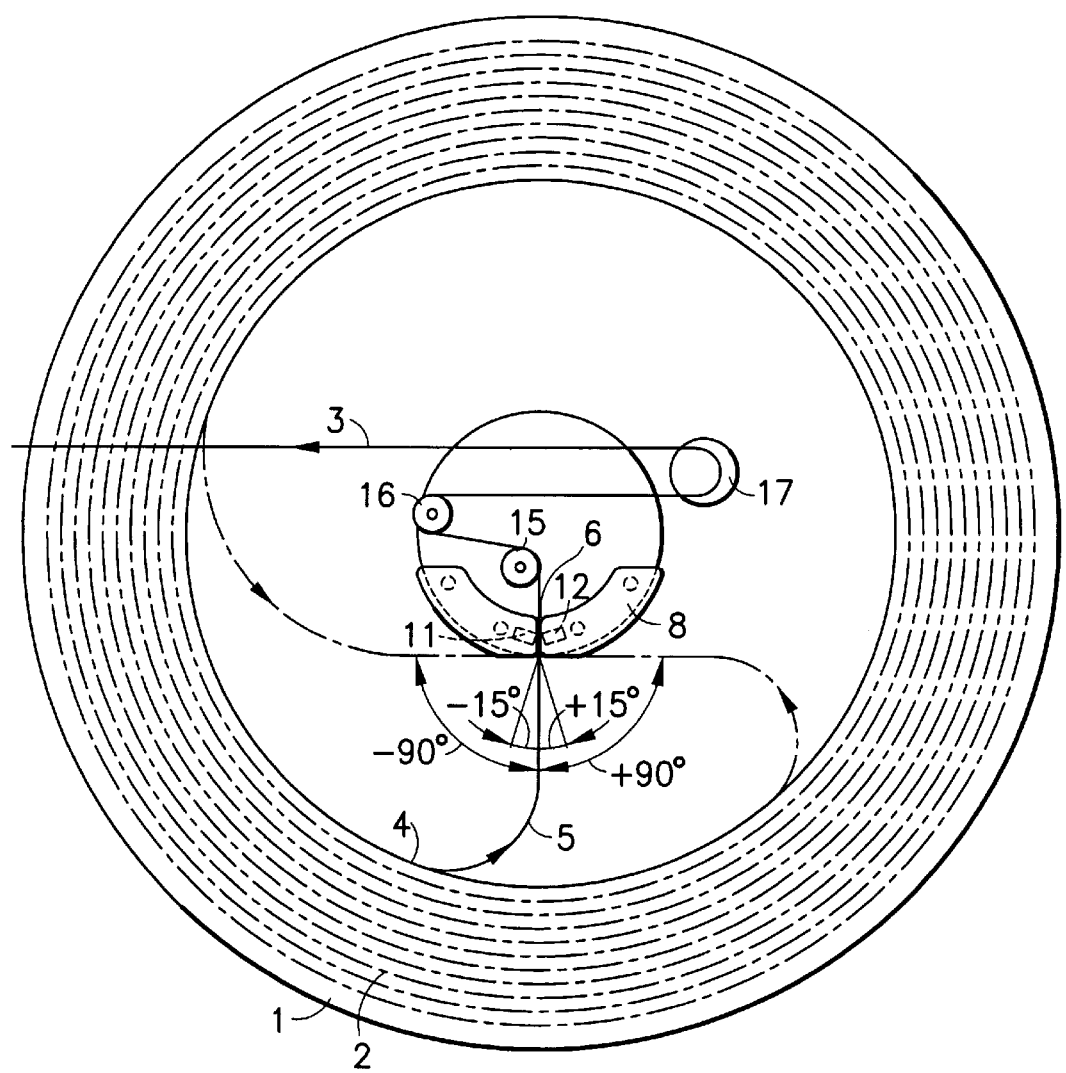
FIG. 2 shows a diagrammatic top view of the film turntable disc and insertion unit with three different lead-in angles indicated by dot-dashed lines.

As is shown in FIGS. 1 and 2, the film supply for a film show, wound up to form a reel 2, rests on a horizontally rotatable film turntable disc 1. The film turntable disc 1 is rotated by a controllable electric motor M via a transmission.

The film strip 3 leading to the film projector P is taken from the inside convolution 4 of the reel 2. This film tape 5 removed leads to a lead-in point 6 which is formed by in each case two upper and lower pairs of lead-in skids 8, 9 on a central insertion unit 7 fixed in location. The two pairs of lead-in skids 8, 9 are joined to one another by bolts 10.

In the immediate vicinity of the lead-in point 6, a reflection light barrier 11, 12 is arranged in each case between the left-hand and right-hand pair of lead-in skids 8, 9. The two reflection light barriers 11, 12 are components of a dual infrared LED in which one diode 13 operates as IR light transmitter and the other diode 14 operates as IR light receiver.

The two reflection light barriers 11, 12 are arranged obliquely at such an angle to one another and symmetrically to the radial plane extending through the lead-in point 6, in such a manner that the light rays emitted by the transmitter diodes 13 of the two light barriers intersect at the lead-in point 6.

The criterion for a light barrier opening or both light barriers opening or one of the light barriers closing, which then triggers a correction process at the motor control, is the magnitude of the lead-angle at which the film tape 5 taken from the inside convolution 4 is fed into the guide slot between the pairs of lead-in skids 8, 9. This, in turn, determines whether the light ray emitted by the transmitter diode 13, after being reflected at one tape side of the film tape 5 removed, falls back to the diode 14 acting as receiver. The reflection light barriers 11, 12 are shown in FIG. 1 as being at the same respective height. However, reflection light barriers 11, 12 may be mounted offset in height with respect to one another, as indicated by the numeral 12' in FIG. 1.

Figure 3:
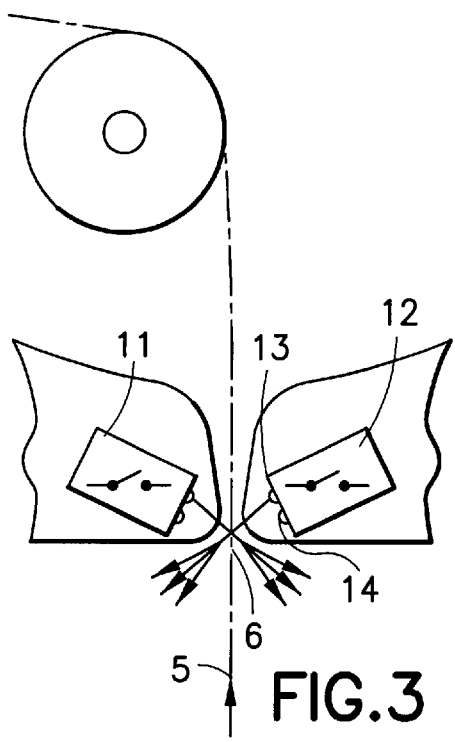
FIG. 3 shows the course of the reflections and switching states if the film strip is fed in radially.
Figure 4:
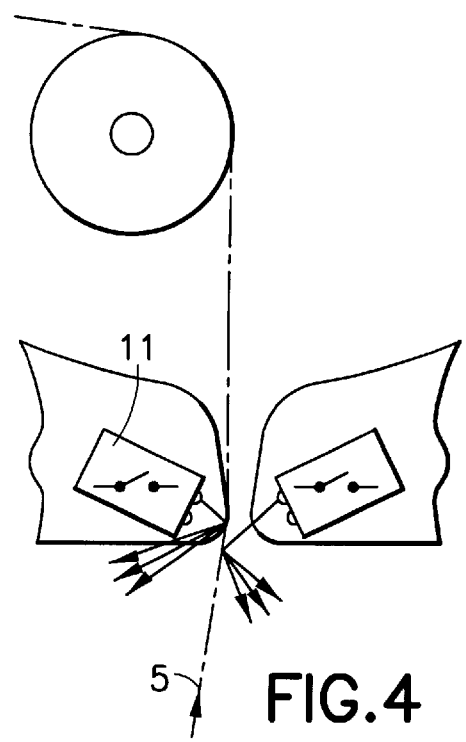
FIG. 4 shows the course of the reflections and switching states if the film strip is fed in slightly obliquely.

If the film strip separating from the inside convolution 4 during the film showing operation moves in an area which deviates from the radial lead-in plane by +15° to -15° as indicated in FIGS. 3 and 4, the reflection light barriers 11, 12 remain opened and it is not necessary to correct the drive motor.

Figure 5:
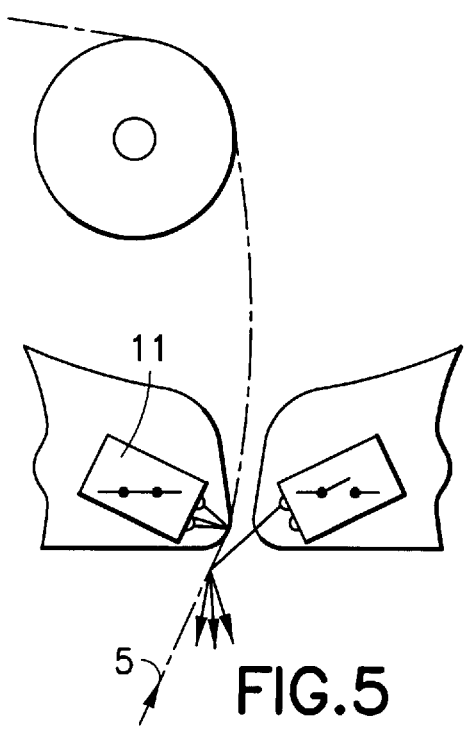
FIG. 5 shows the course of the reflections and switching states if the film strip is fed in at about 30° with respect to the radial plane.
Figure 6:
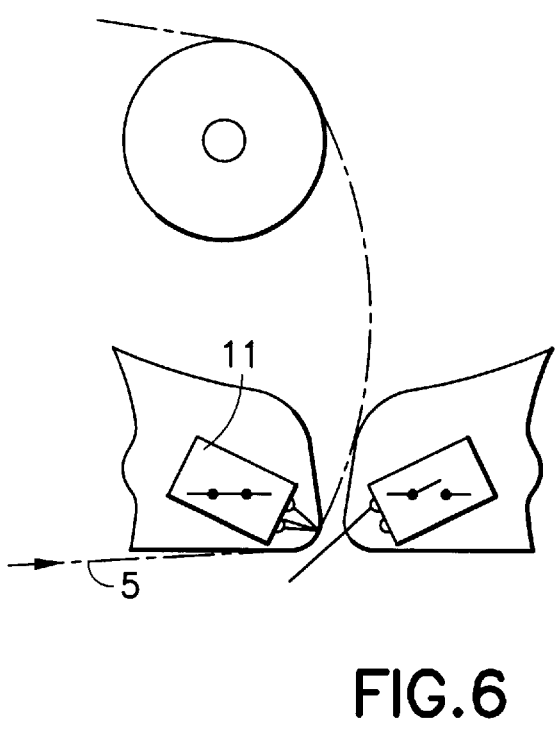
FIG. 6 shows the course of the reflections and switching states if the film strip is fed in at approximately 90° with respect to the radial plane.

If the separating film strip is fed in at a greater angle than 15°, namely within a range from 15° to 90° or from -15° to -90° with respect to the radial plane, as is indicated in FIGS. 5 and 6, one of the two reflection light barriers remains opened while the other one closes a control circuit to the electric motor in order to increase or reduce, respectively, the speed of the film turntable disc until the film strip separates from the reel at a point where it is fed in again approximately radially.

The criterion of whether the film strip separating from the reel is fed in lagging or leading, that is to say whether a positive or negative lead-in angle occurs, is decided by an evaluating circuit which in each case twice in alternation performs a light and dark measurement, determines the difference and compares it with the opposite side. In each case, the greater value from the comparison measurement of the mean light and dark values fed to the right-hand or left-hand light barrier decides, above a predetermined threshold value corresponding to the angle of incidence of +15° or -15°, whether the film turntable disc must be driven slightly faster or slightly slower. These comparison measurements counteract the incidence of polarized external light and contamination and aging of the infrared light barriers.

Behind the gap formed by the pair of lead-in skids 8, 9, two deflection rollers 15, 16 and an obliquely positioned deflection roller 17, via which the film strip 3 is guided to the projector, are mounted on the insertion unit 7.

What is claimed is:

1. A device for controlling rotational speed of a horizontally rotatable supply turntable driven by a controllable electric motor, a tape reel resting on the supply turntable and having a tape-shaped material wound thereon, said tape-shaped material having an inside convolution on said tape reel and being continuously removed from the inside convolution and supplied in the form of a tape loop to an insertion unit fixed concentrically to the turntable, said insertion unit comprising:

a light-emitting diode having a lead-in point;

two reflection barriers behind the lead-in point of said insertion unit, said reflection barriers being arranged on opposite respective sides of said tape-like material for detecting a lead-in angle of the tape-shaped material at said lead-in point; and a closed loop control for receiving a quantity signal corresponding to the detected lead-in angle and for comparing the quantity signal with a reference quantity for deriving an error signal used for controlling the rotational speed of said electric motor, and thereby controlling rotational speed of the horizontally rotatable supply turntable.

2. Device according to claim 1, characterized in that the lead-in point is formed by an upper and a lower pair of lead-in skids having arch-shaped rounded edges which form a gap therebetween for feeding in said tape-like material.

3. Device according to claim 1, characterized in that the two reflection light barriers are arranged on the insertion unit with an angular offset from one another and symmetrically to the radial plane extending through the lead-in point such that light rays emitted by transmitter diodes of the two reflection light barriers intersect at the lead-in point.

4. Device according to claim 3, characterized in that the reflection light barriers are mounted offset in height with respect to one another.

5. Device according to claim 3, characterized in that the transmitter diodes and the receiver diodes are focused on the lead-in point.

6. Device according to claim 5, characterized in that, in the case of a lead-in angle of the tape removed from the reel of up to ±15° with respect to the radial plane, both reflection light barriers opened.

7. Device according to claim 5, characterized in that in the event of a leading separation from the reel and a lead-in angle within the range from 15° to 90°, one light barrier is opened and the other light barrier closes a circuit for slowing down the turntable drive.

8. Device according to claim 7, characterized in that the electric motor forming the turntable drive is controlled in an evaluation circuit following the two reflection light barriers.

9. Device according to claim 8, characterized in that the evaluation circuit alternately performs light and dark measurements and generates a difference signal for the switch allocation.

10. Device according to claim 5, characterized in that in the case of a lagging separation from the reel and a lead-in angle of −15° to −90°, one light barrier is opened and the other light barrier closes a circuit for accelerating the turntable drive.

11. Device according to claim 10, characterized in that the electric motor forming the turntable drive is controlled in an evaluation circuit following the two reflection light barriers.

12. Device according to claim 11, characterized in that the evaluation circuit alternately performs light and dark measurements and generates a difference signal for the switch allocation.

13. Device according to claim 1, characterized in that the reflection light barriers emit and receive infrared light.

14. A method for controlling the speed of a horizontally rotatable supply turntable for tape-shaped material which is taken from an inside convolution of a tape reel resting on said supply turntable and driven by a motor, said tape-shaped material being continuously removed from the inside convolution and being supplied in the form of a tape loop to an insertion unit arranged centrally fixed in a location concentric to the turntable, wherein the method comprises: directing light onto said tape-shaped material at a lead-in point to said insertion unit; measuring the light reflected from the tape-shaped material for detecting the lead-in angle of the tape-shaped material with which said tape-shaped material is entering said insertion unit at the lead-in point; comparing the measured quantity; and deriving from the comparison an error signal used for controlling said motor.

15. Method according to claim 14, characterized in that the lead-in angle is measured by reflection of infrared light on both sides of the tape passing the lead-in point and the associated measurement signals of both sides are compared with one another in their magnitude/amplitude and a difference signal is formed which, when a certain magnitude is reached, is used for correction.

16. A method for controlling rotational speed of a horizontally rotatable supply turntable driven by a controllable motor, said supply turntable having a taped reel resting thereon and a supply of tape-shaped material wound onto said tape reel, said tape-shaped material having an inside convolution on said tape reel, said method comprising the steps of:

continuously removing the tape-shaped material from the inside convolution;

supplying said tape-shaped material removed from said inside convolution in the form of a tape loop to an insertion unit arranged concentrically to the turntable such that said tape-shaped material enters said insertion unit at a lead-in angle;

directing light onto said tape-shaped material;

measuring the light reflected from said tape-shaped material;

comparing the measured light reflected from the tape-shaped material to a reference quantity for deriving an error signal; and controlling rotational speed of said motor and said supply turntable in accordance with the error signal.

17. A method according to claim 15, characterized in that lead-in angles are measured by reflection of infrared light on both sides of the tape-shaped material passing a lead-in point of the insertion unit, comparing magnitude amplitude measurement signals of both sides with one another; forming a different signal based on the measurement signals on both sides of the tape-shaped material; comparing the difference signal to a selected magnitude; and controlling the rotational speed of the motor when the certain magnitude is reached.

* * * * *